Aug. 28, 1934.  G. H. FLETCHER  1,971,747

SYSTEM OF MOTOR CONTROL

Filed March 29, 1933  4 Sheets-Sheet 1

Inventor:
George H. Fletcher,
by Harry E. Dunham
His Attorney.

Aug. 28, 1934.        G. H. FLETCHER        1,971,747
SYSTEM OF MOTOR CONTROL
Filed March 29, 1933        4 Sheets-Sheet 2
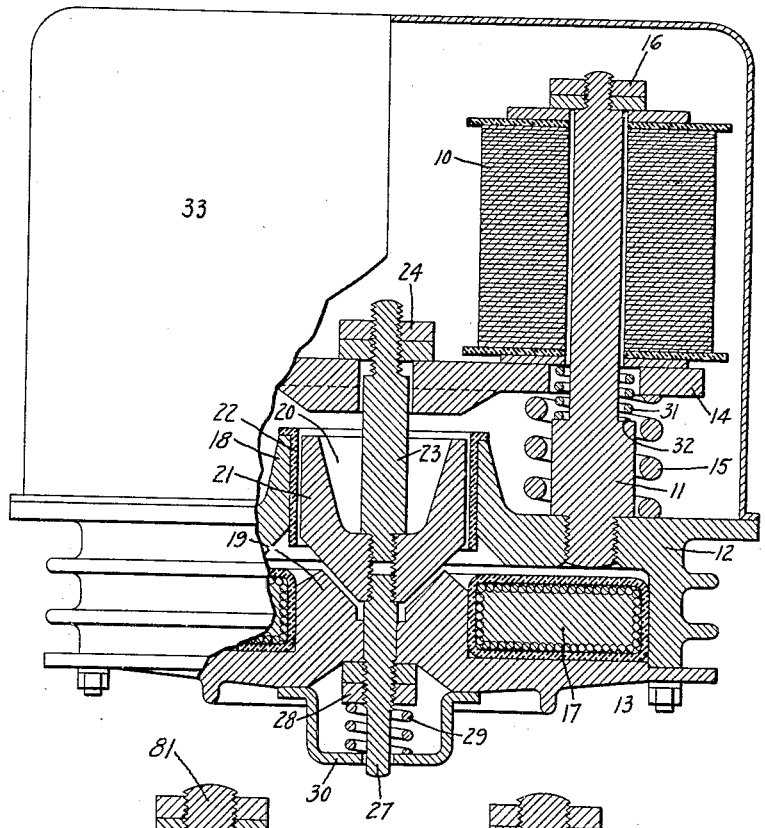
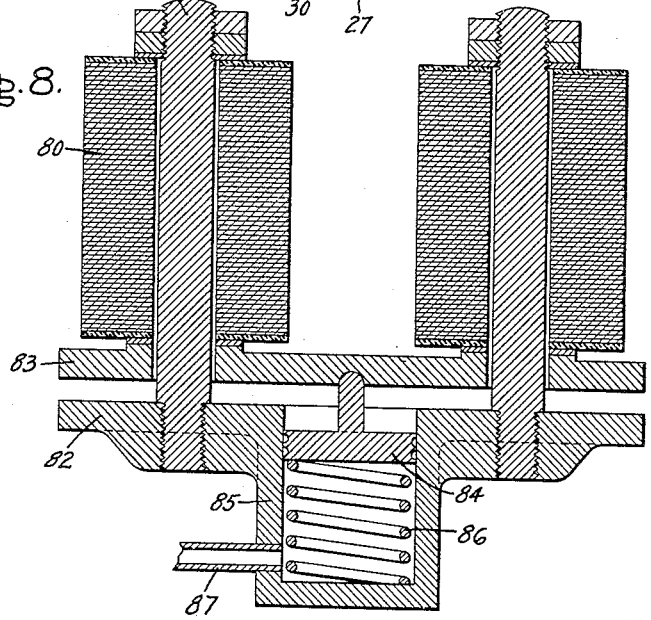
Inventor:
George H. Fletcher,
by Charles E. Tucker
His Attorney.

Aug. 28, 1934. G. H. FLETCHER 1,971,747
SYSTEM OF MOTOR CONTROL
Filed March 29, 1933 4 Sheets-Sheet 3

Inventor:
George H. Fletcher,
by Charles E. Tullar
His Attorney.

Patented Aug. 28, 1934

1,971,747

UNITED STATES PATENT OFFICE 1,971,747

SYSTEM OF MOTOR CONTROL

George H. Fletcher, Sheffield, England, assignor to General Electric Company, a corporation of New York Application March 29, 1933, Serial No. 663,403
In England April 13, 1932

14 Claims. (Cl. 172—179)

This invention relates to systems for the control or regulation of electric motors quipped with series field windings more particularly, though not exclusively, for use in connection with traction motors for electrically propelled vehicles such for instance as tramcars.

The invention has for an object to provide a simple, economical and reliable arrangement whereby rapid acceleration of an electric motor equipped with a series of field winding can be obtained over a wide range of speed variation.

In the improved arrangement according to the present invention the series field winding either wholly, or in part, is connected in shunt with the carbon pile of a carbon pile resistance regulator for diverting current from the series field winding, thereby substantially to weaken the series field excitation of the motor, when the motor current attains a predetermined value.

The carbon pile resistance regulator may be arranged under the control of the usual manual controller employed in motor control systems for adjusting the speed of the motor. Alternatively, the regulator may be arranged directly under the control of the motor current so as to be entirely automatic in its operation.

The invention therefore also provides an arrangement for automatically controlling the speed of an electric motor equipped with a series field winding, wherein the series field winding either wholly, or in part, is connected in shunt with a carbon pile resistance having associated electromagnetically operated, or controlled, means for varying the pressure of the carbon pile to change the effective resistance thereof in accordance with the current in the motor circuit, the carbon pile resistance regulator, comprising the carbon pile and the aforesaid electromagnetically operated or controlled means, being so arranged that when the motor current falls to a predetermined value the pressure of the carbon pile is adjusted to a value at which a substantial part of the motor current is diverted from the series field winding. Conveniently, the electromagnetically operated or controlled means functions to oppose a normal controlling pressure on the carbon pile until the motor current falls to the predetermined value whereupon the carbon pile is merely subjected to the said controlling pressure.

For the control of two electric motors each equipped with a series field winding, the series field windings may be connected in shunt with respective carbon piles associated with a common electromagnetically operated or controlled means for varying the pressure thereof.

Where such an automatic control arrangement as hereinbefore set forth is provided with a carbon pile resistance regulator in which the pressure of the carbon pile is reduced by movement of a magnetic plunger into a cooperating electric solenoid coil energized in accordance with the motor current, it is preferable to provide means for compensating the regulator to offset the tendency in the solenoid magnet for the force on the plunger to increase as the plunger is drawn into the solenoid, in other words, as the air gap is closed. Conveniently, for this purpose the regulator may be provided with an auxiliary operating coil which is energized in accordance with the current flowing through the carbon pile and acts on the plunger to modify the action of the solenoid coil. Thus, as the plunger is drawn into the solenoid coil, and the pressure on the carbon pile thereby reduced, the amount of current diverted through the carbon pile decreases, with the result that the resultant force acting on the plunger is reduced. Alternatively this tendency can be offset by a special arrangement of springs hereinafter set forth in connection with a preferred construction of regulator.

In employing such an automatic control arrangement in a motor control system having means for varying the speed of the motor, that is to say accelerating, or retarding (for instance during rheostatic braking) the motor by cutting out of the motor circuit a controlling resistance progressively in sections, as the motor current attains an appropriate desired value, means are preferably provided for rendering the carbon pile ineffective to divert current from the series field winding during the progressive cutting out of the resistance. For this purpose, the carbon pile resistance regulator may be provided with an auxiliary operating coil which is energized in accordance with the current flowing in the last section of the controlling resistance to be cut out and assists the electromagnetically operated or controlled means to oppose the normally acting controlling pressure on the carbon pile. Thus, when this section of controlling resistance is carrying current, the auxiliary operating coil tends to reduce the pressure on the carbon pile. As a result, substantially no current is diverted from the series field winding until the motor has fallen to a value which will be lower than the said predetermined value. However when the aforesaid last section of the controlling resistance is cut out of the motor circuit, the auxiliary operating coil is rendered ineffective and accordingly the regulator will function in normal manner to divert current from the series field winding when the motor current falls to the aforesaid predetermined value. Alternatively, instead of providing the regulator with an auxiliary coil as described, an electric switch may be included in circuit with the carbon pile across the series field winding. This switch may be so arranged as to open when the said last section of the controlling resistance is carrying current but to close when this section of resistance is cut out of the motor circuit. Conveniently this switch may be of the electromagnetically operated or controlled type, commonly called a contactor, the energization of the operating or controlling coil of which is conveniently governed directly by, or indirectly as through a relay responsive to, the voltage across said section of controlling resistance.

In order that the invention may be clearly understood it will now be described, by way of example, with reference to the accompanying drawings in which Fig. 1 is a schematic diagram of a simple arrangement according to the invention for automatically controlling a single electric motor equipped with a series field winding.

Fig. 5 shows, diagrammatically, in part sectional elevation a preferred form of carbon pile resistance regulator in which the pressure on the carbon piles is varied by the action of a solenoid and cooperating magnetic plunger.

Fig. 8 shows, diagrammatically, in sectional elevation another preferred form of carbon pile resistance regulator, the pressure on the carbon piles of which is varied by fluid pressure.

In Figs. 1-4 of the drawings, like parts are indicated by like reference characters.

Figure 1:
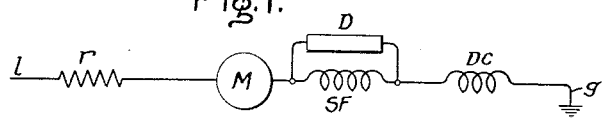

In the simple form of automatic control arrangement for an electric motor illustrated in Fig. 1, the motor armature is indicated at M and its series field winding at SF. In this arrangement the series field winding SF has connected across it the carbon pile, indicated at D, of an electromagnetically operated or controlled carbon pile resistance regulator, preferably in one of the forms hereinafter more particularly described, for diverting current from the series field winding and thereby weakening the field excitation of the motor so as to change its speed. The operating or controlling coil of the regulator is indicated, at DC, as being included in circuit with the motor armature M, its series field winding SF and the usual controlling resistance $r$ between the line conductors $l$ and $g$. The arrangement is adjusted so that normally the carbon pile D is subjected to a minimum pressure so long as the current in the motor circuit, and hence through the coil DC, exceeds a predetermined value, but when the current in the coil DC falls to this predetermined value— as it will do as the speed of the motor increases— the carbon pile is compressed under the control of the coil DC and its effective resistance thereby reduced to a value at which a substantial part of the current in the motor circuit is diverted from the field winding SF and the speed of the motor accordingly substantially increased.

Figure 2:
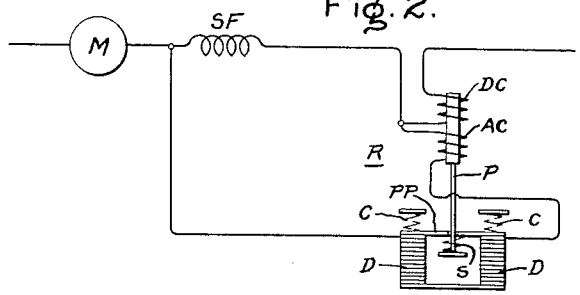
Fig. 2 is a schematic diagram of an automatic control arrangement according to the invention for an electric motor, illustrating more particularly the method of compounding a solenoid and plunger operated carbon pile resistance regulator therefor.

Referring to the arrangement illustrated in Fig. 2 the motor whose armature is indicated at M and series field winding at SF has its excitation controlled by a solenoid-and-plunger-operated carbon pile resistance regulator R. In this arrangement two carbon piles D included in local circuit with the series field SF are subjected to pressure applied by controlling springs C through a pressure plate PP while a solenoid coil DC and cooperating magnetic plunger P, which acts through a biasing spring S on the pressure plate PP, function to relieve the pressure on the carbon piles D when the current in the coil DC exceeds a predetermined value corresponding to the value at which it is desired that the field excitation of the motor should be weakened by field current diversion. For this purpose the solenoid coil DC is connected in series with the motor armature M and series field winding SF. However, in this arrangement, the regulator is also provided with an auxiliary operating coil AC which is connected in series with the carbon piles D across the series field winding SF. In this instance the coil AC is adapted to assist the solenoid coil DC to reduce the pressure on the carbon piles D as the current in the coil DC increases beyond the predetermined value. Thus, as the current in the coil DC increases beyond the predetermined value, and the plunger P is further attracted into the solenoid DC thereby to reduce the pressure of the carbon piles D, less current is diverted from the series field winding SF and thus the current in the compounding coil AC is reduced so that its assisting effect is reduced. In this manner the diverter is compensated against the tendency, which is usual in solenoid magnets, for the force acting on the plunger to increase, corresponding in this case to the pressure on the carbon piles being relieved to an increasingly greater extent, as the plunger is withdrawn into the solenoid, or in other words as the airgap closes.

Figure 3:
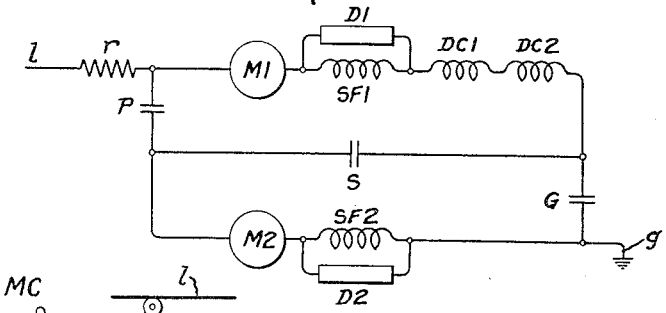
Fig. 3 is a schematic diagram of an automatic control arrangement according to the invention forming part of a control system for two electric motors provided with means for changing the connections of the motors from series to parallel by the shunt or short-circuited transition method.
Figure 4:
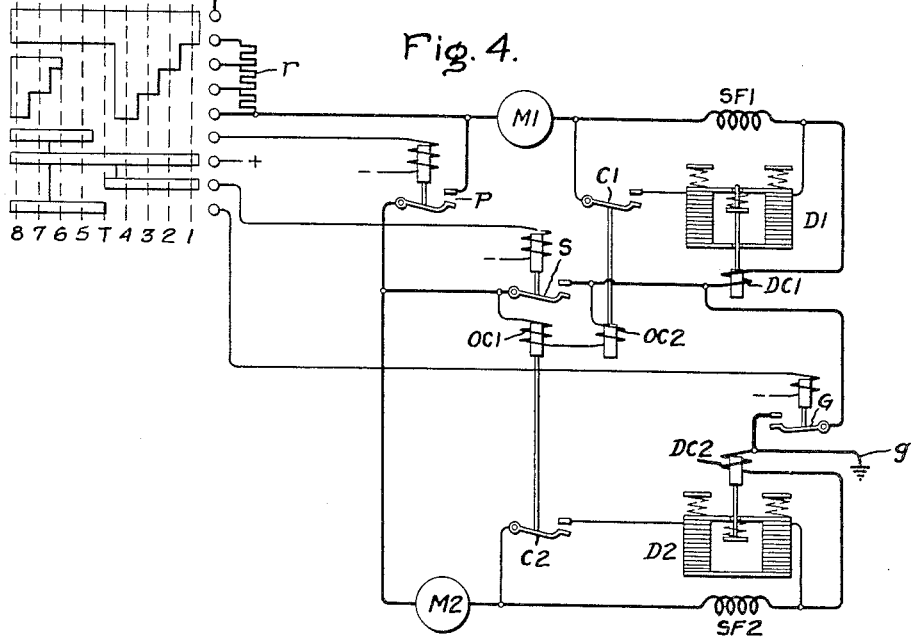
Fig. 4 is a schematic diagram illustrating a modification of the system illustrated in Fig. 3.

In applying the invention to a control system for two electric motors having means for changing the connections of the motors from series to parallel by the shunt or short-circuited method of transition, special precautions are preferably provided for avoiding the possibility of current being diverted, during the transition period, from the series field winding of that motor which is successively short-circuited and open-circuited since, if current is diverted from the series field winding by means of a noninductive resistance—as is the case with a carbon pile resistance—when the motor is short-circuited, the field excitation of the motor is maintained on account of the local short-circuit thereby provided and a very large reverse current may be fed into the short-circuit which may result in injury to the control apparatus when the short-circuit is eventually opened on the last step of the transition. For this purpose, according to an important subsidiary feature of the invention, the electromagnetically operating or controlling means for the carbon piles associated with the respective motors, are energized in accordance with the current in the circuit of that motor which is connected to the line while the other motor is being short-circuited during the transition of the motor connections from series to parallel. In this manner, the motor which is successively short-circuited and open-circuited during the transition period will not have current diverted from its field unless the current in the circuit of the other motor falls to the predetermined value, an occurrence which, at this stage in the operation of the motors, will rarely be the case. For example in the control system illustrated in Fig. 3, two motors the armatures of which are indicated at M1 and M2 and field windings at SF1 and SF2 are adapted to be connected to the line conductors $l$ and $g$ in circuit with a controlling resistance $r$, first in series with each other and then in parallel. The transition from the series connection to the parallel connection of the motors is effected by the well known shunt or short-circuited method of transition and accordingly the figure shows the minimum number of switches necessary to effect this grouping of the motors. Thus the motors are connected in series with one another by the "series" switch S; during transition to the parallel connections the "ground" switch G is closed thereby to establish a short circuit across the motor through the "series" switch S whereupon the "series" switch S is opened and the "paralleling" switch P is closed thereby to complete the connections for operating the motors in parallel with one another. In the arrangement illustrated, the series field windings SF1 and SF2 are respectively shunted by carbon pile resistances D1 and D2, the pressures of the carbon piles of which are varied by means of the operating coils DC1 and DC2. As shown, the operating coils DC1 and DC2 are connected in circuit with the motor M1 which is that motor which is adapted to be connected across the line when the other motor is short-circuited during the transition period. By this arrangement the carbon piles D1 and D2 are subjected to but minimum pressure so long as the current in the circuit of the motor M1 exceeds a predetermined value and the arrangement precludes the possibility of the pressure on the carbon pile D2 being increased, and therefore the excitation of the field winding SF2 being weakened, during such time as the motor M2 is short-circuited through the "series" switch S and the "ground" switch G. In a modified form of the invention shown in Fig. 4, the operating or controlling means DC1 and DC2 for the respective carbon pile resistances D1 and D2 appertaining to the two motors M and M2 are energized in accordance with the current in the individual motor circuits, and electric switching means C1 and C2 are provided to interrupt the connection between the carbon piles and the field windings SF1 and SF2. These switches are maintained open during operation of the motors in series, the series field weakening only then being effected during operation of the motors in the parallel connection since in general the time of running with the series connection is very short. As shown, the switches may be of the contactor type, their operating coils OC1 and OC2 being arranged to be energized to close the contactors under the appropriate conditions. In the control system illustrated in Fig. 4, two motors having their armatures indicated at M and M2 and their series field windings at SF1 and SF2 are adapted to be connected between the line conductors $l$ & $g$ in series with the controlling resistance $r$ through the medium of the "series" switch S and then to be connected in parallel with one another by closure of the "ground" switch G and then the opening of the "series" switch S and finally the closing of the parallel switch P. In this arrangement a carbon pile resistance D1 for diverting current from the series field winding SF1 is connected in series with a contactor C1 across the series field winding SF1 while a carbon pile resistance D2 for diverting current from the series field winding SF2 is connected in series with a contactor C2 across the series field winding SF2. The pressures on the carbon piles D1 and D2 are controlled by the operating coils DC1 and DC2 respectively, which are included in circuit with the individual motors to which they appertain. The operating coils OC1 and OC2 associated with the contactors C1 and C2 are connected in a local circuit with the contacts of the "series" switch S whereby the coils OC1 and OC2 are de-energized when the "series" switch S is closed, that is to say, during operation of the motors M and M2 in the series connection. Accordingly the contactors C1 and C2 are open during this time and thus the carbon pile resistances D1 and D2 are rendered ineffective to divert current from the series field windings SF1 and SF2. However, at the end of the transition period when the "series" switch S is opened and the connections for operating the motors M and M2 in parallel with one another are established, the operating coils OC1 and OC2 are energized whereupon the contactors C1 and C2 are closed and the carbon pile resistances D1 and D2 are rendered effective to divert current from the series field windings SF1 and SF2 under the control of their associated operating or controlling coils DC1 and DC2.

The invention also comprises improvements in carbon pile resistance regulators for adapting same to control arrangements such as hereinbefore described.

Thus according to an important feature of the invention a carbon pile resistance regulator particularly adapted for use in a control arrangement as hereinbefore described is so arranged that the pressure to which the carbon piles are, as a whole, subjected always exceeds a predetermined value which is greater than zero.

In a convenient form of carbon pile resistance regulator the carbon piles are subjected to a controlling spring pressure which can be relieved in measure by the action of an electric solenoid coil and cooperating magnetic plunger but which is never completely balanced thereby whatever value of current flows in the solenoid coil.

A preferred construction of this form of regulator comprises one or more carbon piles each supported on a spring, a plate resiliently biased towards the carbon pile or piles for applying pressure to same in a direction to assist the supporting spring or springs therefor, and an electric solenoid coil and cooperating magnetic plunger adapted when the solenoid coil is energized by current of predetermined magnitude to withdraw the pressure plate from the carbon pile or piles. Referring now to Fig. 5, in the carbon pile resistance regulator therein illustrated, one or more piles or columns 10 of carbon discs are provided, centered on rods 11 secured to the yoke 12 of a solenoid magnet 13. Conveniently, the yoke 12 is of annular form and the carbon piles 10 of which only one is shown in the figure, are arranged circumferentially thereof.

A pressure plate 14 common to all the piles where more than one is provided is arranged in contact with the lower ends of the carbon piles 10, being pressed thereagainst by means of compression springs 15 interposed between the pressure plate 14 and the body of the yoke 12. The ends of the carbon piles 10 remote from the yoke 12 abut on flanges or collars 16 provided on the guide rods 11.

The magnet yoke 12 is of pot shape and is arranged to enclose the exciting coil 17 and to provied two pole pieces 18 and 19, which cooperate with an annular pole piece 21 on the magnetic plunger 20. The pole piece 18 has a cylindrical surface and is provided with a non-magnetic liner 22 whereby the airgap between the pole piece 18 and cooperating polar surface of the plunger pole piece 21 is maintained substantially constant throughout the range of movement of the plunger 20. The other pole piece 19 of the magnet yoke 12 is formed with a conical surface which cooperates with a correspondingly formed surface on the plunger pole piece 21. By this arrangement the air gap between the pole piece 19 and the plunger pole piece 21 varies through a predetermined range during movement of the plunger 20.

The plunger 20 is formed with an extension 23 which passes loosely through a central hole in the pressure plate 14 and is provided beyond this hole with an adjustable collar 24, the arrangement being such that, on movement of the plunger 20 in the direction of closing the air gap between the plunger pole piece 21 and the yoke pole piece 19, the collar 24 engages with the pressure plate 14 and tends to withdraw the pressure plate 14 from the carbon piles 10.

A further extension 27 of the plunger 20 extends loosely through a central hole in the yoke 12 and is provided with an adjustable collar 28. A spring 29 is interposed between this collar 28 and a bracket or abutment 30 on the magnetic yoke 12 so as to bias the plunger 20 in the direction corresponding to the lengthening of the air gap between the plunger pole piece 21 and yoke pole piece 19.

A spring 31 is interposed between each carbon pile 10 and an abutment 32 on the guide rod 11 for the pile, said spring being arranged to pass freely through a hole in the pressure plate 14. The spring 31 functions to exert pressure on the carbon pile 10 independently of the movement or position of the pressure plate 14. The whole assembly is conveniently protected by means of a suitable cover 33.

In operation, when the solenoid 17 is deenergized, the carbon piles 10 are maintained under pressure by virtue of their own weight, the action of the controlling spring 31 and the engagement thereof by the pressure plate 14 which is subjected to the action of the spring 15. When, however, the current supplied to the solenoid coil 17 attains a value sufficient to cause the necessary movement of the plunger 20 against the action of its biasing spring 29 to move the pressure plate 14 in the direction away from the carbon piles 10, the pressure of the carbon piles 10 is reduced; as the current supplied to the solenoid coil 17 increases the pressure on the carbon piles 10 is still further reduced; finally, when the current in the coil 17 attains a value sufficient to move the pressure plate 14 out of engagement with the carbon piles 10, the latter are subject to a minimum pressure as determined by the controlling springs 31.

The regulator can be adjusted to meet the requirements of practice by appropriate choice and adjustment of the springs 15, 29 and 31, and to some extent, by adjustment of the length of the airgap between the plunger 20 and the yoke 12 in the condition of zero current through the exciting coil 17.

In applying such regulator as just described to the control of the series field winding of a motor, one or more of the carbon piles 10 may be arranged in shunt with the whole or a part of the series field winding of the motor and the excited coil 17 may be traversed by the main motor current or a current representative thereof. The resistance of the carbon pile or piles 10 when subjected to the minimum pressure exerted by the controlling springs 31 will be so chosen that only a low value of current will be diverted from the series field winding. This will correspond to a definite value of motor current which can readily be predetermined, being that value of current which must flow in the exciting coil 17 before the plunger 20 will release the pressure plate 14 to allow it to move into contact with the carbon piles 10 under the control of the biasing spring 15. A definite maximum pressure will be exerted on the carbon piles 10 when the collar 28 on the plunger 20 engages with the yoke 12 and this will correspond to maximum diversion of current from the series field winding.

Figure 6:
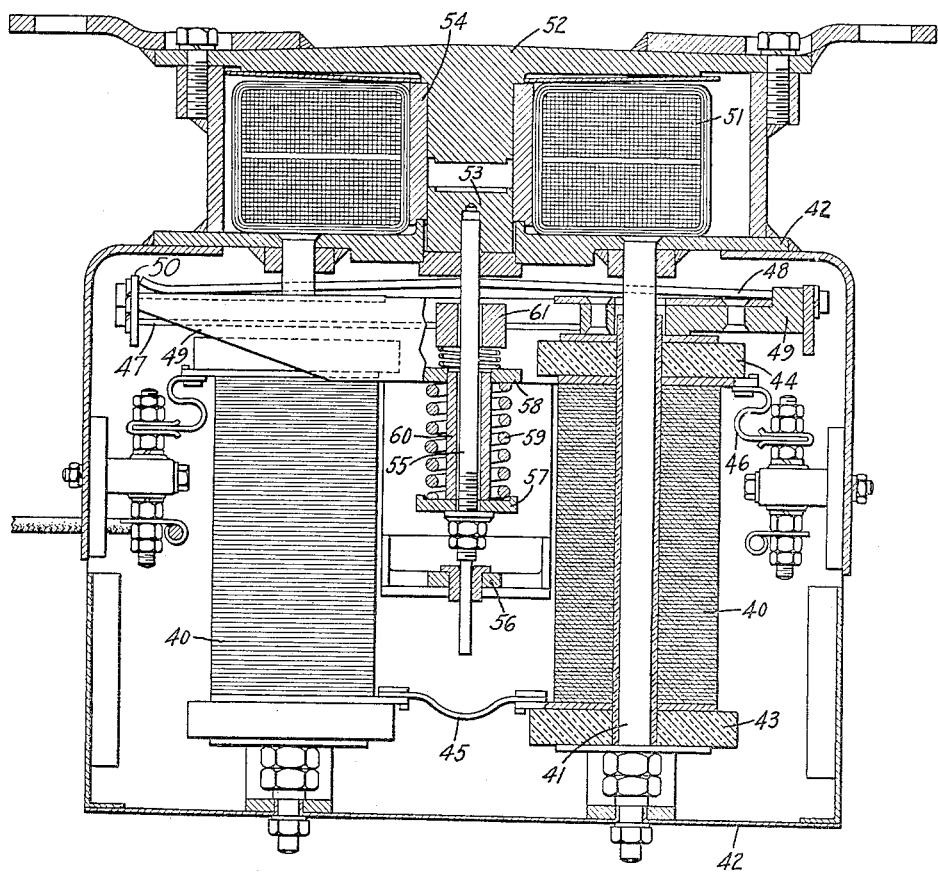
Fig. 6 shows in part sectional elevation a preferred constructional form of solenoid-and-plunger-operated carbon pile resistance regulator.

A modified form of the invention comprises one or more carbon piles subjected to the action of a spring tending to compress the pile or piles, an electric solenoid coil and a cooperating magnetic plunger acting through a spring to oppose the action of the first mentioned compression spring when the solenoid coil is energized by current of magnitude in excess of the predetermined value. Preferably the carbon piles are subjected to the action of a bar spring which is arranged so as to be deflected by and during movement of the magnetic plunger into the solenoid for reducing the pressure on the carbon piles and thereby to increase the opposition to movement of the plunger during movement of the latter further into the solenoid as the current in the solenoid coil increases from the predetermined value. Referring to the constructional form of carbon pile resistance regulator illustrated in Fig. 6 the carbon piles are shown at 40. Each carbon pile 40 is assembled on a rod 41 suitably insulated from the carbon pile and suitably mounted at its ends in a housing 42 so that the carbon pile is substantially vertical. The carbon discs of each pile are disposed between insulating discs 43 and 44 and suitable terminal means are provided at 45 and 46 for electrically connecting the carbon piles in electric circuits. Pressure is applied at the upper ends of the carbon piles 40 by means of a bar spring 47 acting directly on the end discs 44 of the piles 40 and a bar spring 48 acting on the end discs 44 through a beam 49. The spring 47 engages at its ends with abutments 50 on the underside of the beam 49.

To vary the pressure of the carbon piles 40, an electromagnet is provided comprising an exciting coil 51 carried on a yoke 52 which is mounted vertically above the carbon piles, and a cooperating plunger 53, which is arranged to move into and out of a sleeve 54 for the exciting coil 51 under the action of the magnetic field set up by the current flowing in the exciting coil 51. As shown, the plunger 53 has connected thereto a rod 55 suitably mounted for longitudinal movement in a bracket 56 disposed between the carbon piles 40. The rod 55 is provided with a collar 57 between which and a cross member 58 on the beam 49 is interposed a spring 59. The rod 55 is also provided with a sleeve 60 which, by movement of the rod 55, is adapted to move a block 61, slidably mounted on the rod 55, into and out of engagement with the bar spring 48. The block 61 is rigidly connected to the bar spring 47 so that by movement of the block the spring is deflected.

The arrangement is such that, when the current flowing in the exciting coil 51 has a value below that at which the plunger 53 is attracted into the coil sleeve 54, the carbon piles 40 are subjected to a controlling spring pressure exerted by the bar spring 47 and also the bar spring 48 acting through the beam 49. When the current flowing in the coil 51 attains a value sufficient to cause the plunger 53 to begin to move into the core 54, the block 61 is displaced thereby to reduce the pressure exerted on the piles 40 by the spring 47. As the current increases and the plunger 53 is moved further into the core 54, the block 61 is engaged with the bar spring 48, and thus the pressure exerted by the spring 48 on the carbon piles 40 is reduced. During the movement of the plunger 53 into the coil 51, and the consequent deflection of the bar spring 47 the distance between the points of engagement of the spring with the abutments 50 decreases so that the spring 47 in effect becomes stiffer. Similarly, as the spring 48 is deflected during the later part of the movement of the plunger 53 in the coil, the distance between the points of engagement of the spring 48 with the beam 49 decreases and in effect the spring 48 becomes stiffer. Thus as the plunger 53 moves into the coil 51 the opposition to movement of the plunger 53 is increased. This tends to offset the tendency for an increasingly greater force to be exerted on the plunger 53 as the latter is drawn further into the coil 51. Thus this special arrangement of springs functions to achieve the same object as the compounding winding previously referred to.

In employing this regulator in a control arrangement as hereinbefore described, the exciting coil 51 will be energized in accordance with the motor current and it will be seen that so long as the motor current exceeds a predetermined value, corresponding to the value at which the plunger 53 commences to be released, the carbon piles 40 are subjected to the minimum controlling pressure exerted by the bar springs 47 and 48 in the position of the latter in which they are held by the sleeve 60 acting through the block 61. However, when the motor current falls to a value at which the plunger 53 is released, the block 61 will be released by the sleeve 60, whereupon the springs 47 and 48 will be permitted to assume the normal position in which they exert a maximum pressure on the carbon piles 40. This pressure can be chosen to corresponding with the pressure necessary to produce an effective resistance value of the carbon piles 40 sufficient to cause the required substantial current diversion from the series field.

Figure 7:
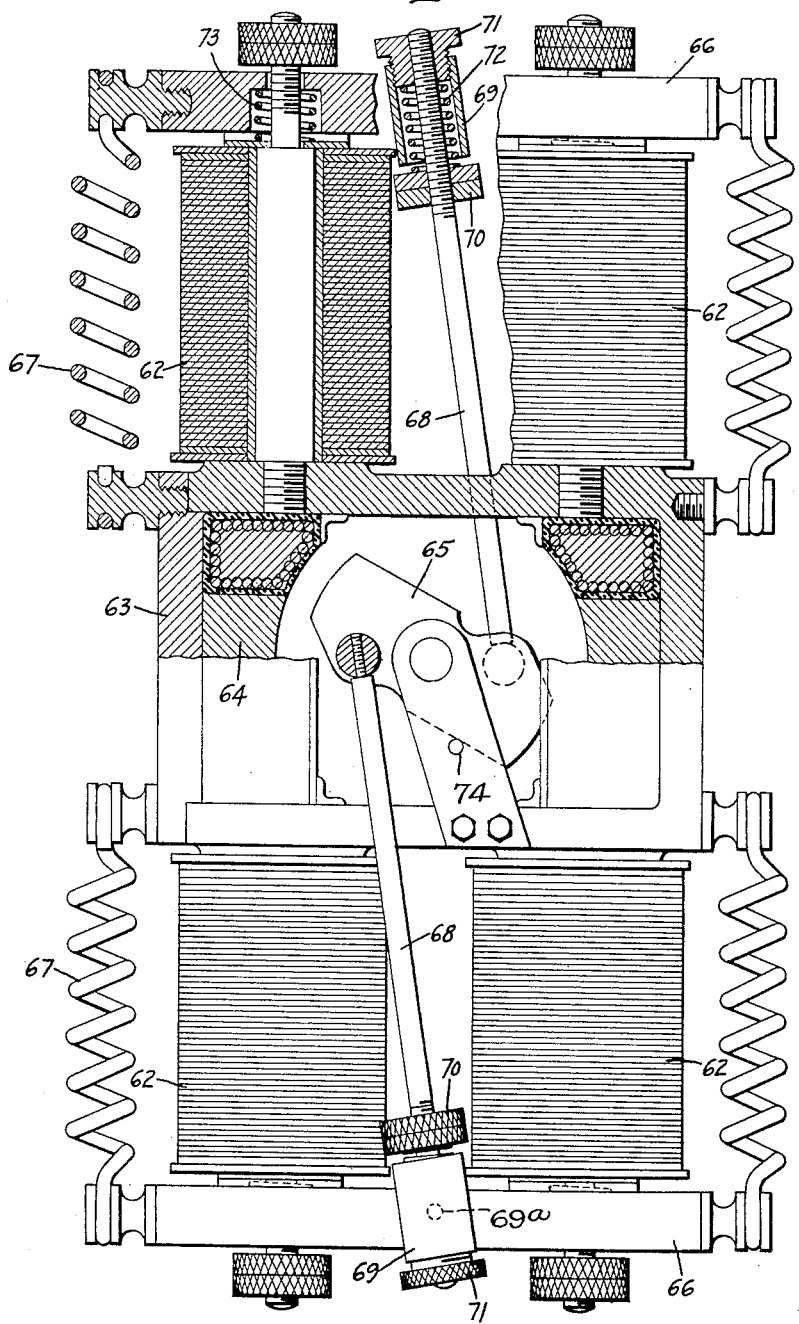
Fig. 7 shows, diagrammatically, in part sectional elevation another preferred form of carbon pile resistance regulator, the pressure on the carbon piles of which is varied by the action of a torque motor.

Another preferred form of carbon pile resistance regulator comprises one or more carbon piles, a spring-pressed plate for applying pressure to each carbon pile, a spring interposed between the pressure plate and the carbon pile tending to compress the pile, and a torque motor the armature of which is connected to the pressure plate so that when the field magnet of the torque motor is energized by current of predetermined value the pressure plate is withdrawn from the pile whereupon the said spring acts alone to compress the pile. Referring now to Fig. 7, four carbon piles 62 are arranged two on opposite sides of a rectangular magnetic yoke 63 provided with salient field poles 64 between which operates a rotatable armature 65. The carbon piles 62 are maintained under pressure by engagement of their outer ends with pressure plates 66 which are biased into engagement with the carbon piles by springs 67 suitably connected between the pressure plates 66 and the yoke 63. As shown, the pressure plates 66 are adapted to be moved out of engagement with the carbon piles 62 against the action of the biasing springs 67 by means of suitable cranks 68 connected to the armature 65 and accommodated at their outer ends in sleeves 69 pivotally secured at 69a to the pressure plates 66. Conveniently each crank 68 is provided with an adjustable collar 70 between which and the closure 71 of the sleeve 69 is interposed a spring 72 serving to bias the crank 68 in a direction tending to separate the collar 70 from the sleeve 69. Springs 73 are interposed between the pressure plates 66 and the carbon piles 62 so as to exert normal controlling pressures on the carbon piles 62.

The arrangement is such that, so long as the current in the exciting coils of the field poles 64 is less than a value sufficient to cause the armature 65 to be attracted to the poles 64 away from the stop 74 the carbon piles 62 are subjected to pressure exerted by the controlling springs 73 and the springs 67 acting through the pressure plates 66. However, when the current in the exciting coils increases to a value sufficient for the armature 65 to be attracted to the poles 64, the cranks 68 are caused to move the pressure plates 66 against the action of the biasing springs 67 out of engagement with the carbon piles 62 whereupon the carbon piles 62 are subjected only to the pressure exerted by the controlling springs 73.

A further form of regulator comprises one or more carbon piles, a plate on which the carbon piles are supported and which is carried by a spring-loaded piston acting in a cylinder, and an electromagnetically controlled valve for admitting to the cylinder fluid under pressure to increase the pressure of the carbon pile or piles so long as the current in the operating coil exceeds a predetermined value. Referring now to Figure 8, the carbon piles 80 are centered on rods 81 extending from a base 82, being supported on a pressure plate 83 which is connected to a piston 84 operating in the cylinder 85. The piston 84 is loaded by means of a spring 86 disposed within the cylinder 85. Fluid under pressure can be admitted to the cylinder 85 through a conduit 87 which will be provided with an electromagnetically operated or controlled valve (not shown). In this arrangement, the carbon piles 80 are subjected to a minimum pressure which is determined by the spring 86 while when the valve is opened to admit fluid under pressure to the cylinder 85 the pressure on the carbon piles 80 will be increased to a maximum value which may be determined by the maximum pressure of the fluid and the area selected for the piston 84. In the arrangement contemplated, the carbon piles 80 are subjected to the minimum pressure so long as the current in the coil controlling the aforesaid valve exceeds a predetermined value, while when this current falls below this predetermined value fluid is admitted to the cylinder 85 and the pressure on the carbon piles 80 is increased.

In applying the form of regulator last described to the control of the series field winding of a motor, the regulator may be placed under the control of the manual controller, the arrangements being such that while the controller is being operated to cut out the starting resistances the carbon piles are subjected to the minimum pressure, but when the controller has been moved to the position for cutting out all the starting resistances, corresponding to a predetermined adjustment of the operating speed of the motor, further movement of the controller will result in the pressure on the carbon piles being increased thereby to cause the appropriate diversion of current from the series field winding.

It will be understood that various modifications in the detail construction and arrangement of the apparatus can be made within the scope of the invention.

What is claimed is,

1. The combination with an electric motor provided with a series field winding, of a carbon pile resistance connected in shunt with said winding, biasing means normally maintaining said carbon pile resistance under pressure and means responsive to a predetermined current in said motor for controlling said biasing means to release said pressure and thereby control the series field excitation of said motor as said motor current decreases below said predetermined current.

2. The combination with an electric motor provided with a series field winding, of a carbon pile resistance connected in shunt with said winding, biasing means normally maintaining said carbon pile resistance under pressure electromagnetically operated means responsive to a predetermined current in said motor for releasing said pressure to said resistance to change its effective resistance, said electromagnetically operated means being arranged so that when the current in said motor falls below said predetermined value the pressure on said resistance is adjusted to a value at which a substantial part of the motor current is diverted from said series field winding through said resistance.

3. The combination with an electric motor provided with a series field winding, of a carbon pile resistance connected in shunt with said winding, means for applying a normal controlling pressure on said resistance to divert a substantial part of the current in said motor from said series field winding, and means responsive to the current in said motor for applying a pressure in opposition to said normal controlling pressure until the current in said motor falls to a predetermined value.

4. The combination with an electric motor provided with a series field winding, of a carbon pile resistance connected in shunt with said winding, means for applying a normal controlling pressure to said resistance, means for applying a pressure in opposition to said first means, an electric winding energized in accordance with the current through said motor for actuating said second means, and a second auxiliary winding energized in response to the current flowing through said resistance for modifying the action of said first winding.

5. In a control system for an electric motor having a series field winding, the combination with a controlling resistance in the circuit of the motor, means for controlling said resistance in sections to vary the speed of the motor, a carbon pile resistance connected in shunt with the series field winding, electromagnetically operated means responsive to the current in the motor for applying a varying pressure to said carbon pile resistance to change its effective resistance, said electromagnetically operated means being arranged so that when the current in the motor falls to a predetermined value the pressure on said carbon pile resistance is adjusted to a value at which a substantial part of the current in the motor is diverted from the series field winding, and means responsive to the operation of said resistance controlling means for rendering said carbon pile resistance ineffective to divert current from the series field windings during the control of said controlling resistance.

6. In a control system for two electric motors each provided with a series field winding, the combination with means for changing the connections of the motors from series to parallel by the shunt method of transition, a carbon pile resistance connected in shunt with each of the field windings, electromagnetically operated means responsive to the current in the respective motors for applying a varying pressure to each of said resistances to change its effective resistance, and means responsive to the changing of the connections of the motors from series to parallel for energizing the electromagnetically operated means for the motor which is short circuited in accordance with current in the other motor during the transition of the motor connections from series to parallel.

7. In a control system for two electric motors each provided with a series field winding, the combination with control means for changing the connections of the motors from series to parallel by the shunt method of transition, a carbon pile resistance connected in shunt with each of the field windings, electromagnetically operated means responsive to the current in the respective motors for applying a varying pressure to each of said resistances to change its effective resistance, switching means in circuit with each of said electromagnetically operated means, and means responsive to the operation of said control means for opening said switches during the transition from series to parallel connections of said motor.

8. In a control system for two electric motors each provided with a series field winding, the combination with control means for changing the connections of the motors from series to parallel by the shunt method of transition, a carbon pile resistance connected in shunt with each of the field windings, electromagnetically operated means responsive to the current in the respective motors for applying a varying pressure to each of said resistances to change its effective resistance, switching means in circuit with each of said electromagnetically operated means, means responsive to the operation of said control means for opening said switches during the transition from series to parallel connections of said motors, and means for applying a predetermined pressure to said resistances.

9. In a control system for two electric motors each provided with a series field winding, the combination with control means for changing the connections of the motors from series to parallel by the shunt method of transition, a carbon pile resistance connected in shunt with each of the field windings, electromagnetically operated means responsive to the current in the respective motors for applying a varying pressure to each of said resistances to change its effective resistance, switching means in circuit with each of said electromagnetically operated means, means responsive to the operation of said control means for opening said switches during the transition from series to parallel connections of said motors, and a spring for applying a pressure to each of said resistances in opposition to said electromagnetically operated means and of greater magnitude than the force exerted by said electromagnetically operated means under all conditions of operation.

10. The combination with an electric motor provided with a series field winding, of a carbon pile resistance connected in shunt with said winding, a spring pressed plate for applying pressure to said resistance, a spring interposed between said plate and said resistance tending to compress said resistance and a torque motor connected to said pressure plate so as to apply a pressure to withdraw the plate, and means for energizing said torque motor in response to the current in said motor so that when said current reaches a predetermined value said pressure plate is withdrawn from the resistance whereupon said resistance is compressed by said spring alone.

11. The combination with an electric motor provided with a series field winding of a carbon pile resistance connected in shunt with said winding, a plate on which said carbon pile is supported, a cylinder, a piston in said cylinder connected to said plate, a source of fluid under pressure a valve for said cylinder for admitting fluid under pressure to said cylinder, and a winding for controlling said valve connected in the circuit of said motor whereby fluid is admitted to said cylinder to increase the pressure on said resistance when the current in said winding exceeds a predetermined value.

12. A motor control system comprising an electric motor having a series field winding, an accelerating resistor connected in series circuit relation with said motor, a carbon pile resistance connected in shunt with said field winding, biasing means normally maintaining said carbon pile resistance under pressure, a controller for controlling said accelerating resistor to accelerate said motor, and means responsive to a predetermined current value in said motor for controlling said biasing means to release said pressure on said carbon pile resistance so as to control the series field excitation of said motor as said motor current decreases below said predetermined current value.

13. In a control system for a plurality of electric motors each provided with a series field winding, the combination of means for changing the connections of the motors from series to parallel, a carbon pile resistance for each of said field windings, control means for connecting said carbon pile resistance in shunt with each of said field windings, an accelerating resistor for controlling the acceleration of said motors when connected in either series or parallel, electromagnetically operated means responsive to the current in the respective motors for applying a varying pressure to each of said resistances to change its effective resistance, and means responsive to the changing of the connections of the motors from series to parallel for energizing said control means whereby said carbon pile resistances are effective to control the excitation of said motors only during parallel operation of said motors.

14. In a control system for a plurality of electric motors each provided with a series field winding, the combination with means for changing the connections of the motors from series to parallel, an accelerating resistor for controlling the acceleration of said motors when connected in either series or parallel, a carbon pile resistance for each of said field windings, control means for connecting said carbon pile resistance in shunt circuit relation with each of said field windings, biasing means for exerting a predetermined pressure on each of said carbon pile resistances, electromagnetically operated means responsive to current in the respective motors for varying the pressure produced by said biasing means to change the effective resistance of said carbon pile resistance, and means responsive to the transition of said motors from series to parallel for operating said control means for connecting said carbon pile resistances in shunt circuit relation with said field windings so as to control the excitation of said field windings during the parallel operation of said motors.

GEORGE H. FLETCHER.